(12) United States Patent
Ikeda (10) Patent No.: US 6,325,940 B1
(45) Date of Patent: Dec. 4, 2001

(54) SIMULATED MOVING BED CHROMATOGRAPHIC SEPARATION SYSTEM

(75) Inventor: Hirokazu Ikeda, Arai (JP)

(73) Assignee: Daicel Chemical Industries Ltd., Osaka (JP)

( * ) Notice: Subject to any disclaimer, the term of this patent is extended or adjusted under 35 U.S.C. 154(b) by 0 days.

(21) Appl. No.: 09/527,266

(22) Filed: Mar. 17, 2000

(51) Int. Cl.[7] ..................................................... B01D 15/08
(52) U.S. Cl. ........................................ 210/659; 210/198.2
(58) Field of Search ................................... 210/635, 656, 210/659, 198.2

(56) References Cited

U.S. PATENT DOCUMENTS

| | | | | |
|---|---|---|---|---|
| 4,468,331 | * | 8/1984 | Antle | 210/659 |
| 4,872,992 | * | 10/1989 | Oquendo | 210/659 |
| 4,925,567 | * | 5/1990 | McAleese | 210/656 |
| 5,064,539 | * | 11/1991 | Tanimura | 210/198.2 |
| 5,198,120 | * | 3/1993 | Masuda | 210/659 |
| 5,223,143 | * | 6/1993 | Masuda | 210/659 |
| 5,391,299 | * | 2/1995 | Masuda | 210/659 |
| 5,434,298 | * | 7/1995 | Negawa | 210/659 |
| 5,434,299 | * | 7/1995 | Negawa | 210/659 |
| 5,470,464 | * | 11/1995 | Priegnitz | 210/659 |
| 5,498,752 | * | 3/1996 | Negawa | 210/659 |
| 5,630,943 | * | 5/1997 | Grill | 210/659 |
| 5,770,088 | * | 6/1998 | Ikeda | 210/659 |

\* cited by examiner

Primary Examiner—Ernest G. Therkorn (57) ABSTRACT

A simulated moving bed chromatographic separation system for separating from a feedstock the constituents thereof, comprising packed beds filled with separating fillers, is provided, by which the separation performance of the packed beds can be evaluated without removing the packed beds from the circular fluid passage. This system is further provided with the circular fluid passage having at least four packed beds connected in series and endlessly to each other, a desorbing liquid introducing port, an extract draw-out port for drawing out the extract containing a larger amount of a constituent strongly adsorbed on the fillers, of constituents contained in a feedstock from the circular fluid passage, a feedstock introducing port for introducing the feedstock into the fluid circulating passage, and a raffinate draw-out port for drawing out the raffinate containing a larger amount of a constituent weakly adsorbed on the fillers, of the constituents. The desorbing liquid introducing port, extract draw-out port, feedstock introducing port and raffinate draw-out port are arranged so that these ports may be intermittently shifted on the fluid circulating passage without changing this order. This system is also provided with packed bed performance evaluating means.

14 Claims, 4 Drawing Sheets

SIMULATED MOVING BED CHROMATOGRAPHIC SEPARATION SYSTEM

BACKGROUND OF THE INVENTION

1. Field of the Invention

This invention relates to a simulated moving bed chromatographic separation system, particularly to a simulated moving bed chromatographic system capable of evaluating the separation performance of the unit packed beds of the system without removing the packed beds from the system.

2. Prior Art

In recent years, the simulated moving bed chromatographic system has been frequently and broadly used for separation or purification of various chemical products such as drugs, pharmaceuticals, agrochemicals, perfumes, sucrose, etc.

In general, the simulated moving bed chromatographic separation system for separating from a feedstock the constituents thereof, such as drugs, pharmaceuticals, agrochemicals, perfumes, sucrose, etc., is provided with a fluid circulating passage through which a liquid (hereunder referred to as "circulating liquids") flows and which has at least four columns containing separating fillers packed therein, connected in series and endlessly to each other by piping, a desorbing liquid introducing port for introducing the desorbing liquid into the fluid circulating passage, an extract draw-out port for drawing out a circulating liquid containing a larger amount of constituents in the feedstock to be strongly adsorbed on the fillers (hereunder referred to as "extract"), a feedstock introducing port for introducing the feedstock containing the constituents into the fluid circulating passage, and a raffinate draw-out port for drawing out a circulating liquid containing a larger amount of constituents to be weakly adsorbed on the fillers (hereunder referred to as "raffinate"). The desorbing liquid introducing port, extract draw-out port, feedstock introducing port and raffinate draw-out port are arranged in this order on the fluid circulating passage and designed so that their positions may be intermittently shifted without changing this order.

Operating the simulated moving bed chromatographic separation system for a long time causes the fillers in the columns to be deteriorated or the performance of the columns or piping to be reduced due to deposition of impurities on the columns or piping. Therefore, the purity of the strongly adsorptive constituents in the resulting extract or the weakly adsorptive constituents in the resulting raffinate may be lowered.

In such case, prior art simulated moving bed chromatographic separation systems have in general been examined by removing the columns from the fluid circulating passage, mounting the columns one by one on a high-speed chromatographic apparatus and then evaluating the separating performance of the columns.

Thus, the examination operation is complicated, and it takes a long time to know which column is deteriorated.

Furthermore, when the separating performance of the columns evaluated for by the high-speed chromatographic apparatus are again mounted on the fluid circulating passage, the packings or O-rings on the ends of the columns may be damaged, so liquid leakage may occur at the ends of the columns.

SUMMARY OF THE INVENTION

The object of this invention is to provide a simulated moving bed chromatographic separation system free of the problems of prior art simulated moving bed chromatographic systems as mentioned above.

In particular, the object of this invention is to provide a simulated moving bed chromatographic system comprising unit packed columns, which can be examined without removing these columns from the system on whether the deterioration of the system is caused by the columns or not, and, if yes, which column causes the deterioration.

In order to solve the problems as mentioned above, this invention provides the simulated moving bed chromatographic system as follows:

(1) a simulated moving bed chromatographic separation system for separating from a feedstock the constituents thereof, which comprises a fluid circulating passage having the fluid forcibly circulated therethrough and having at least four packed beds filled with separating fillers and connected in series and endlessly to each other; a desorbing liquid introducing port for introducing the desorbing liquid into the fluid circulating passage; an extract draw-out port for drawing out the extract containing a larger amount of a constituent strongly adsorbed on the fillers, of the constituents contained in a feedstock from said fluid circulating passage; a feedstock introducing port for introducing the feedstock into the fluid circulating passage; and a raffinate draw-out port for drawing out the raffinate containing a larger amount of a constituent weakly adsorbed on the fillers, of the constituents, wherein the desorbing liquid introducing port, extract draw-out port, feedstock introducing port and raffinate draw-out port are arranged in this order in the direction of fluid flow on the fluid circulating passage, and designed so that the positions of these ports are successively but intermittently shifted along said fluid circulating passage without changing this order, the system also comprising packed bed performance evaluating means for examining the condition of each of the constituents separated in each of said packed beds, by injecting a standard solution of which the kinds of the constituents contained and their concentrations are known and the desorbing liquid into each of said packed beds; and (2) a simulated moving bed chromatographic separation system recited in (1) above, which is provided with desorbing liquid injecting means for injecting a desorbing liquid at the inlet side end of the packed beds, a standard solution injecting means for injecting the standard solution at the inlet side end of the packed beds, and a detector means at the outlet side end of the packed beds for detecting the constituents desorbed by the packed beds.

DESCRIPTION OF REFERENCE NUMERALS a to d . . . column, Cab, Cbc, Ccd, $C_1$, $C_2$ . . . pipe, Fc . . . circulating passage, Da to Dd . . . desorbing liquid introducing line, Ea to Ed . . . extract draw-out line, Fa to Fd . . . feedstock introducing line, Ra to Rd . . . raffinate draw-out line, D . . . desorbing liquid supplying pipe, E . . . extract draw-out pipe, F . . . feedstock supplying pipe, R . . . raffinate draw-out pipe, P . . . pump, $P_D$ . . . desorbing liquid pump, $P_F$ . . . feedstock pump, $RV_D$, $RV_F$, $RV_E$, $RV_R$ . . . rotary valves, VDa to VDd, VEa to VEd, Vfa to VFd, VRa to VRd . . . on-off valves, $DT_1$, $DT_2$, DTa, DTb, DTc, DTd . . . detectors, $BV_1$, $BV_2$ . . . back-pressure valve

DETAILED DESCRIPTION OF THE PREFERRED EMBODIMENTS OF THE INVENTION

As mentioned above, the simulated moving bed chromatographic separation system of this invention is provided with (A) (a) a fluid circulating passage having the fluid forcibly circulated therethrough and having at least four packed beds filled with separating fillers and connected in series and endlessly to each other;

(b) a desorbing liquid introducing port for introducing the desorbing liquid into the fluid circulating passage;

(c) an extract draw-out port for drawing out the extract rich in a constituent strongly adsorbed on said fillers, of constituents contained in a feedstock from the fluid circulating passage;

(d) a feedstock introducing port for introducing the feedstock into the fluid circulating passage; and (e) a raffinate draw-out port for drawing out the raffinate rich in a constituent weakly adsorbed on the fillers, of the constituents, and wherein (B) the desorbing liquid introducing port, extract draw-out port, feedstock introducing port and raffinate draw-out port are
arranged in this order in the direction of fluid flow on the fluid circulating passage, and
designed so that the positions of these inlets and outlets are successively but intermittently shifted along said fluid circulating passage without changing the order, (C) the system also comprising packed bed performance evaluating means for examining the condition of each of said constituents separated in each of said packed beds, by injecting a standard solution of which the kinds of the constituents contained and their concentrations are known and said desorbing liquid into each of the packed beds.

The strongly adsorbed constituent and weakly adsorbed constituent of the constituents contained in the feedstock are different in relative adsorbability to the packed bed. The constituent more strongly adsorptive on the packed bed is the "strongly adsorptive constituent", and the more weakly adsorbed on the packed bed is the "weakly adsorptive constituent".

Elements of This Invention

1. Fluid Circulating Passage

In the simulated moving bed chromatographic separation system of this invention, four or more packed beds are connected in series and endlessly to each other to form the fluid circulating passage through which a liquid is forcibly circulated in one way.

For example, the passage may be formed by connecting the beds to each other by piping.

The passage may be provided with means for forcibly circulating the liquid in one way.

The forcibly circulating means may have any structure or type whichever can forcibly circulate a liquid in one way.

For example, a pump may be inserted into the passage as a forcibly circulating means. Such a pump is not limited, and a positive displacement type such as a diaphragm pump or a plunger pump and a turbo type such as a centrifugal pump may be used. Of these pumps, those of a positive displacement type have valves provided at both suction side and discharge side thereof. Therefore, they do not allow the liquid to flow in an opposite way, are easily responsive to high pressures, and allow the liquid to flow in an exact amount. Therefore, pumps of a positive displacement type are preferred in this invention. The diaphragm pump is most preferred, because the easily wearing parts, such as a piston and plunger, of this pump do not come in contact with the circulating liquid. Where the centrifugal pump is used, a check valve may preferably be provided near the discharge outlet of the pump to prevent the circulating liquid from flowing in an opposite direction.

Alternatively, a pressure-regulating valve may be used in combination to make a balance of pressure in the passage, thereby allowing the circulating liquid to flow in one direction.

The passage is provided with a desorbing liquid introducing port for introducing the desorbing liquid into the passage, an extract draw-out port for drawing out the extract from the passage, a feedstock introducing port for introducing into the passage the feedstock containing a mixture of ingredients to be separated therefrom, and a raffinate draw-out port for drawing out the raffinate from the passage, in this order. These inlets and outlets are designed to allow them to shift in the direction of the circulating liquid flowing inside the passage.

The desorbing liquid introducing port may be provided with a plurality of pipes for introducing the desorbing liquid and switching means for in turn switching the desorbing liquid introducing pipes. This structure is the same with the extract draw-out port, feedstock introducing port and raffinate draw-out port. The switching means may be a suitable switching valve such as a rotary valve or on-off valve. The on-off valve is a valve that works in accordance with on-off control. The on-off valve includes a pneumatically drivable on-off valve, which can be opened or closed by pneumatic pressure, or an electrically drivable valve such as an on-off valve. The switching means may be controlled by a regulating means such as a microcomputer or personal computer, so that the switching means may be, for example, switched at a predetermined interval.

The extract draw-out port and raffinate draw-out port may be provided with flow control valves, respectively, so that the amounts of the extract and raffinate drawn out may be controlled. Alternatively, the extract and raffinate of predetermined amounts may be drawn out with a pump. Furthermore, to the desorbing liquid introducing port and feedstock introducing port, may be connected a desorbing liquid pump of a discharge-changeable type and a feedstock pump of a discharge-changeable type, respectively. Thus, the amount of the desorbing liquid and that of the feedstock introduced may be controlled by controlling the respective discharging amounts of the desorbing liquid pump and the feedstock pump. Alternatively, the desorbing liquid introducing port and feedstock introducing port may be provided with pumps of a volume-fixed type and throttling valves, respectively.

In the fluid circulating passage, there are provided desorbing zone IV in the packed beds between the desorbing liquid introducing port and the extract draw-out port, concentrating zone III in the packed beds between the extract draw-out port and the feedstock introducing port, refining zone II in the packed beds between the feedstock introducing port and the raffinate draw-out port, and adsorbing zone I in the packed beds between the raffinate draw-out port and the desorbing liquid introducing port.

In desorbing zone IV, the desorbing liquid introduced at the desorbing liquid introducing port flows together with the circulating liquid through the packed beds. When the desorbing liquid is brought into contact with the separating fillers, the constituents strongly adsorbed on the separating fillers are desorbed and drawn out as an extract at the extract draw-out port. The concentration of the strongly adsorptive constituents in the circulating liquid immediately after the desorbing liquid introducing port in desorbing zone IV, is substantially zero (0). This concentration gradually increases in the direction of the circulating liquid flowing in desorbing zone IV.

In concentrating zone III, the strongly adsorptive constituents in the circulating liquid are adsorbed on the separating fillers, on the other hand, the weakly adsorptive constituents are desorbed. Therefore, the concentration of the strongly adsorptive constituent begins to decrease, on the other hand, that of the weakly adsorptive constituents begins to increase in the direction of the circulating liquid flowing in the concentrating zone.

In refining zone II, the strongly adsorptive constituents in the feedstock introduced at the feedstock introducing port are adsorbed on the separating fillers, on the other hand, the weakly adsorptive constituents adsorbed on the separating fillers are desorbed. In refining zone II, the concentration of the strongly adsorptive constituents approaches to zero (0), on the other hand, the concentration of the weakly adsorptive constituents increases. Thus, the raffinate containing a high content of the weakly adsorptive constituents is drawn out at the raffinate draw-out port.

In adsorbing zone I, the separating fillers adsorb the weakly adsorptive constituents, and hence the concentration of the weakly adsorptive constituents gradually decreases until it becomes substantially zero (0). Thus, the circulating liquid containing substantially neither the weakly adsorptive constituents nor the strongly adsorptive constituents, in other words, containing the desorbing liquid only, is discharged from adsorbing zone I.

The desorbing liquid introducing port, extract draw-out port, feedstock introducing port and raffinate draw-out port are switched at a predetermined interval, so that desorbing zone IV, concentrating zone III, refining zone II and adsorbing zone I transfer on the fluid circulating passage.

2. Packed Beds

The number of the packed beds included in the fluid circulating passage may be four or more, and particularly not limited. Since the packed beds are included in desorbing zone IV, concentrating zone III, refining zone II and adsorbing zone I, the number is preferably 4, 6, 8, 10, 12 or 24.

The packed beds constituting the fluid circulating passage may be columns packed with the separating fillers.

2.1 Separating Fillers

The above-mentioned columns contain the separating fillers capable of adsorbing the constituents to be separated thereon packed therein.

The separating fillers include liquid chromatographic fillers such as normal-phase fillers or reversed-phase fillers, preferably high-speed liquid chromatographic fillers.

The separating fillers vary depending upon the kind of constituents to be separated. For the separating fillers may be used known various isomeric fillers.

For example, optical isomers may be separated using a high molecular compound having an optical activity or a low molecular compound having an optical resolution function. The optically active high molecular compound fillers may be comprised of, for example, silica gel carrier-supported polysaccharide derivatives (esters or carbamates of cellulose or amylose), polyacrylate derivatives or polyamide derivatives; the above-mentioned compounds not supported on the silica gel but formed in beads; or a further cross-linked mass of the above-mentioned compounds. Furthermore, the low molecular compound fillers having the optical resolution function may be comprised of, for example, a carrier of an inorganic material, such as silica gel, alumina, zirconia, titania, silicates or diatomaceous earth, or an organic material, such as polyurethane, polystyrene or polyacrylic derivatives, having supported thereon the low molecular compound having the optical resolution function, such as an amino acid or derivatives thereof, crown ether or derivatives thereof, or cyclodextrin or derivatives thereof.

The compound fillers having the optical resolution function may be commercially available. The following products made by Daicel Chemical Industries, Ltd. may preferably be used: CHIRALCEL OB, CHIRALCEL OD, CROWNPAK CR(+), CHIRALCEL CA-1, CHIRALCEL OA, CHIRALCEL OK, CHIRALCEL OJ, CHIRALCEL OC, CHIRALCEL OF, CHIRALCEL OG, CHIRALPAK WH, CHIRALPAK WM, CHIRALPAK WE, CHIRALPAK OT(+), CHIRALPAK OP(+), CHIRALPAK AS, CHIRALPAK AD, CHIRALPAK OJ-R, and CHIRALPAK OD-R (all trademarks).

In an example of dividing an oligosaccharide-containing isomeric sugar into fructose and glucose, e.g., separating oligosacchraide or monosaccharide from a mixture of them, the separating fillers may be an ion-exchange resin for salts of a strongly acidic alkaline earth metal such as calcium, barium or strontium, or a crystallized aluminosilicate, such as Zeolite Y, containing ammonium, sodium, potassium, calcium, strontium, barium or etc. substituted for the exchangeable cations thereof.

In an example of separating fatty acid and triglyceride, a basic ion-exchange resin comprising a skeleton of a copolymer of styrene and divinylbenzene may be used. As commercially available products, reference may be made to a weakly basic ion exchage resin such as Amberlite IRA93 made by Rohm and Haas, or Duolite A377 made by Sumitomo Chemical Co., Ltd., or a strongly basic exchange resin such as Amberlite IRA400 made by Rohm and Haas, or Duolite A161 made by Sumitomo Chemical Co., Ltd.

The average particle size of the separating fillers packed in the columns varies depending upon the kind of constituents to be separated and the volume flow rate of a medium flowing through each of the columns. It is normally 1 to 300 $\mu$m, preferably 2 to 100 $\mu$m. However, for maintaining the pressure loss in the columns at a low level, the average particle size should preferably be adjusted within the range of 10 to 100 $\mu$m. If the average particle size is adjusted within the range above, the pressure loss in the simulated moving bed can be maintained at a lower level, for example, 50 kgf/cm$^2$ or lower. On the other hand, the theoretical number of stages is decreased as the average particle size of the separating fillers becomes larger. Therefore, for practically achieving the theoretical number of stages, the average particle size of the separating fillers is normally 15 to 75 $\mu$m.

2.2 Desorbing Liquid

The desorbing liquid used in this invention may be alcohols such as methanol, ethanol and isopropanol; ketones such as acetone, methylethyl ketone and cyclohexanone; esters such as ethyl acetate, methyl acetate and ethyl butyrate; hydrocarbon such as pentane, hexane, isohexane, cyclohexane and heptane; ethers such as diethylether, dibutylether and diisopropylether; carboxylic acids such as formic acid and acetic acid; aromatic hydrocarbons such as benzene, alkyl benzene and toluene; halogenated hydrocarbons such as monochlorobenzene and dichlorobenzene; amides such as dimethyl formamide; nitriles such as acetonitrile and butyronitrile; pyrrolidones such as N-methylpyrrolidone; water or a buffering solution. Furthermore, the desorbing liquid may also include a mixture of various organic solvents such as the alcohols, ketones and hydrocarbons, or a mixture of a water-compatible organic solvent such as methanol, acetone, acetonitrile, dimethyl formamide or N-methylpyrrolidone with water and/or a buffering solution.

This desorbing liquid may be used as a normal or reversed moving phase. The preferred desorbing liquid is properly decided depending upon the kind of constituents or compounds to be separated. Furthermore, to the desorbing liquid may be added a basic compound such as diethyl amine, triethyl amine or triethanol amine, or an acidic compound such as acetic acid, formic acid or trifluoroacetic acid. The addition of these compounds may improve the separation.

3. Feedstock

The feedstock to be treated according to this invention is not limited as long as It is a two-constituent or multi-constituent mixture. For example, materials to be used in pharmaceuticals, drugs, foodstuffs, animal feeding stuffs or perfumes may be used as the feedstock. Such materials may be thalidomide as a pharmaceutical, EPN as an organic phosphor-based agrochemical, monosodium glutamate as a synthetic flavoring material or menthol as a perfume, and also optically active alcohols, amines, amides and esters.

Furthermore, these constituents may form mixtures of optical isomers, position isomers or materials, some isomers of which are necessary and the other unnecessary in some point of view.

The mixture to be subjected to the separation in this invention may be a multi-constituent mixture such as a three-constituent mixture, four-constituent mixture, etc.

In the case of the multi-constituent mixture, to separate one constituent required through the simulated moving bed chromatographic separation system of this invention, the mixture is firstly divided into a group including the required one and another group including the non-required, and the former is further divided in a subgroup including the required and another subgroup including the non-required. These divisions are further repeated at a predetermined number of times.

Furthermore, the simulated moving bed separation system of this invention may be combined with a batch type separation system in which crystallization, membrane-separation, batch chromatography or distillation is carried out to separate a required one from the multi-constituent mixture.

4. Means of Evaluating Performance of Packed Beds

The means of evaluating the performance of the packed beds has a function of determining the separated status by introducing a standard solution containing a known kind and concentration of the constituents and the desorbing liquid into each of the packed beds forming the fluid circulating passage.

The standard solution may be any solutions that contain predetermined amounts of two or more constituents separable in normal packed beds. To evaluate the performance of the packed beds for separating the strongly adsorptive constituent and weakly adsorptive constituent, a solution containing predetermined amounts of the strongly and weakly adsorptive constituents is preferred as a standard solution.

The means for evaluating the performance of the packed beds may be provided with desorbing liquid injecting means by which a desorbing liquid be injected at the inlet side end of the packed beds, standard solution injecting means by which the standard solution is injected at the inlet side end of the packed beds and a detector for detecting the desorbed constituents discharged from the packed beds.

The means for injecting a desorbing liquid may be provided with a desorbing liquid injecting pipe at the inlet side end of each of the packed beds and desorbing liquid feeding means for feeding a desorbing liquid to the desorbing liquid injecting pipe. The desorbing liquid feeding means may include a plunger pump or a diaphragm pump. Between the desorbing liquid injecting pipe and the desorbing liquid feeding means may be provided switching means such as a rotary valve. Each of the desorbing liquid injecting pipes may be provided with an on-off valve.

The standard solution injecting means may be provided with a standard solution injecting pipe at the inlet side end of the packed bed and standard solution feeding means for feeding a standard solution to the standard solution-feeding pipe. For the standard solution feeding means may be used a plunger pump or a diaphragm pump. Between the standard solution injecting pipe and the standard solution feeding means may be provided switching means such as a rotary valve. Each of the standard solution injecting pipes may be provided with an on-off valve.

The standard solution injecting means may be a standard solution injecting port provided on the desorbing liquid injecting pipe. The injecting port may be one of a type generally used in the high-speed liquid chromatography, such as six-way rotary valve provided with a loop.

The detector may be one of those that are used in the high-speed liquid chromatography. Practically, it can detect the constituents in the desorbing liquid by observing changes in refractive index, absorption of visible rays, absorption of ultraviolet rays, electric conductivity or degree of optical rotary power. The packed bed may be provided at the outlet side end thereof with a liquid discharging pipe for discharging the desorbing liquid and standard solution having been introduced in the packed bed. The liquid discharging pipe may be provided with the detector.

In a simulated moving bed chromatographic separation system of such a type that a desorbing liquid introducing pipe and a feedstock introducing pipe are connected to the fluid circulating passage in the proximity of the inlet of a packed bed, and an extract draw-out pipe and raffinate draw-out pipe are connected to the fluid circulating passage in the proximity of the outlet of the packed bed, the desorbing liquid introducing pipe may also serve for the desorbing liquid injecting pipe, and the feedstock introducing may also serve for the standard solution injecting pipe. Furthermore, either or both of the extract draw-out pipe and the raffinate draw-out pipe may be provided with a detector, which leads to utilizing the pipes as liquid discharging pipes.

The operation of the means for evaluating the performance of the packed beds will be illustrated below.

The switching means, such as an on-off valve, mounted on the desorbing liquid injecting pipe, can be controlled by a controller that regulates the switching means, so that the desorbing liquid introducing pipe, extract draw-out pipe, feedstock introducing pipe and raffinate draw-out pipe can be in turn switched. For example, the valve is opened when the simulated moving bed chromatographic separation system is working for separating and refining the constituents of the feedstock (hereunder referred to as "separation/refinement mode", and closed when the system is working for evaluating the separating performance of the system (hereunder referred to as "performance evaluation modem"). The standard solution injecting means provided with a standard solution injecting pipe, which can be switched, can be controlled so that the standard solution injecting pipe is closed in the separation/refinement mode, and opened in the performance evaluation mode.

As mentioned above, in the separation/refinement mode, the desorbing liquid introducing pipe, extract draw-out pipe, feedstock introducing pipe and raffinate draw-out pipe are in turn switched, and the circulating liquid flows through the fluid circulating passage, thereby separating the strongly adsorptive constituent and the weakly adsorptive constituent in the feedstock. On the other hand, in the performance evaluation mode, the switching of the desorbing liquid introducing pipe, extract draw-out pipe, feedstock introducing pipe and raffinate draw-out pipe, and the circulating of the circulating liquid through the fluid circulating passage are stopped.

The switching between the separation/refinement mode and the performance evaluation mode may be carried out by hand. After the simulated moving bed chromatographic separation system is operated in the separation/refinement mode for a predetermined time, the separation/refinement mode and the performance evaluation mode may be switched by automatically switching the passage. Monitors for continuously determining the concentration or purity of each of the strongly adsorptive constituent in the extract discharged at the extract draw-out port and the weakly adsorptive constituent in the raffinate discharged at the raffinate draw-out port, may be provided at the extract draw-out port and the raffinate draw-out port, respectively. When these monitors detect that the concentration or purity is lowered below a predetermined level, the switching between the separation/refinement mode and the performance evaluation mode may be automatically carried out.

The controller is so designed that the separation performance of packed beds can be evaluated in the performance evaluation mode for all the packed beds at the same time, or for one or more of the packed beds in order.

Where the simulated moving bed chromatographic separation system has such a piping system that the desorbing liquid introducing pipe also serves for the desorbing liquid injecting pipe, the feedstock introducing pipe also for the standard solution injecting pipe, and either or both of the extract draw-out pipe and the raffinate draw-out pipe also for the liquid discharging pipe, the desorbing liquid is injected through the desorbing liquid introducing pipe into the packed bed, the standard solution is injected through the feedstock introducing pipe into the packed bed, and the injected desorbing liquid and standard solution are discharged through any one of the extract draw-out pipe and raffinate draw-out pipe in the performance evaluation mode.

EXAMPLES

This invention will be illustrated below with reference to the drawings attached hereto.

Figure 1:
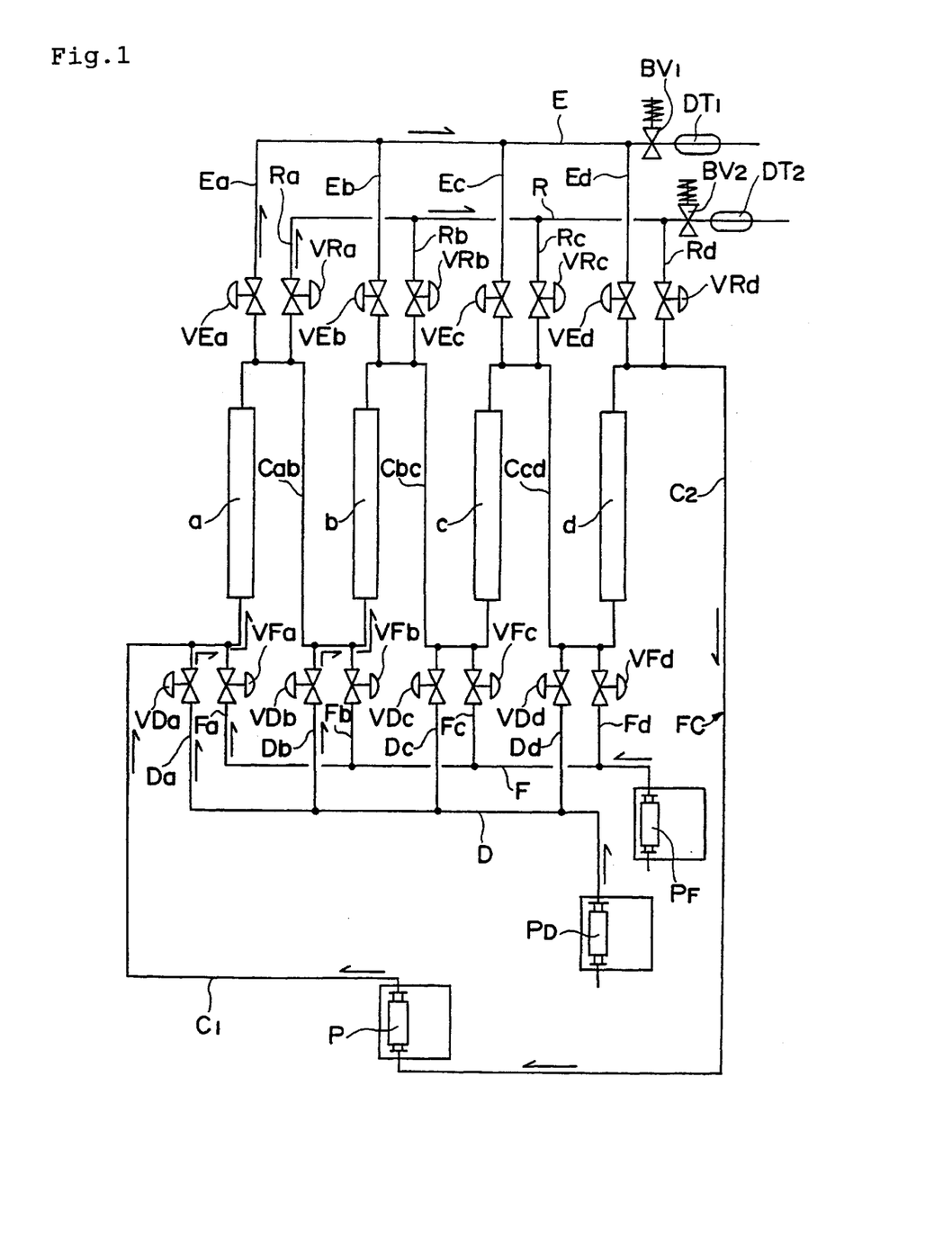
FIG. 1 is a schematic view of a piping of an example of the simulated moving bed chromatographic separation system of this invention.

FIG. 1 is a schematic view of a piping of an example of the simulated moving bed chromatographic separation system of this invention.

The simulated moving bed chromatographic separation system as shown in FIG. 1 is provided with four columns, column a, column b, column c and column d, and a pump P for circulating the circulating liquid through these columns, which is of a diaphragm pump type.

The four columns are packed with a separating filler.

The outlet of the column a and the inlet of column b are connected to each other via pipe Cab, the outlet of column b and the inlet of column c connected to each other via pipe Cbc, and the outlet of column c and the inlet of column d connected to each other via Ccd. The outlet of column d and the suction port of pump P are connected to each other via pipe $C_2$. The discharge port of pump P and the inlet of column a are connected to each other via pipe $C_1$. Accordingly, columns a to d, pipes $C_1$, $C_2$, Cab, Cbc and Ccd, and pump P are integrated to form a circulating passage FC. A circulating liquid is circulated with pump P through circulating passage FC in the direction of the arrow as shown in FIG. 1.

Desorbing liquid introducing lines Da to Dd for supplying the desorbing liquid to the circulating passage FC, and feedstock introducing lines Fa to Fd for supplying a feedstock containing constituents to be separated to the circulating passage FC, are connected to circulating passage FC in the proximity of the respective inlets of columns a to d.

On the other hand, extract draw-out lines Ea to Ed for drawing out the extract from the circulating passage FC, and raffinate draw-out lines Ra to Rd for drawing the raffinate from the circulating passage FC, are connected to circulating passage FC in the proximity of the respective outlets of columns a to d.

A group of desorbing liquid introducing lines Da to Dd and a group of feedstock introducing lines Fa to Fd are branched from desorbing liquid supplying pipe D and feedstock supplying pipe F, respectively. To one end of desorbing liquid supplying pipe D is connected desorbing liquid pump $P_D$, which is a diaphragm pump for supplying the desorbing liquid both in the separation/refinement mode and in the performance evaluation mode. To one end of feedstock supplying pipe F is connected feedstock pump $P_F$, which is a diaphragm pump for supplying the feedstock in the separation/refinement mode and the standard solution in the performance evaluation mode. In the simulated moving bed chromatographic separation system as shown in FIG. 1, the desorbing liquid used in the separation/refinement mode and that used in the performance evaluation mode are identical in composition with each other. For the standard solution is used a solution containing a strongly adsorptive constituent and a weakly adsorptive constituent of predetermined concentrations, dissolved in the same desorbing liquid.

On-off valves VDa to VDd are inserted into desorbing liquid introducing lines Da to Dd, respectively. On-off valves VFa to VFd are inserted into feedstock introducing lines Fa to Fd, respectively.

On the other hand, on-off valves VEa to VEd are inserted into extract draw-out lines Ea to Ed, respectively. On-off valves VRa to VRd are inserted into raffinate draw-out lines Ra to Rd, respectively. Extract draw-out lines Ea to Ed are connected to extract draw-out pipe E for drawing out the extract. Raffinate draw-out lines Ra to Rd are connected to raffinate draw-out pipe R for drawing out the raffinate. Back-pressure valve $BV_1$ is inserted into extract draw-out pipe E, and detector $DT_1$, also inserted into extract draw-out pipe E downstream of back-pressure valve $BV_1$. Back-pressure valve $BV_2$ is inserted into raffinate draw-out pipe R, and detector $DT_2$, also inserted into raffinate draw-out pipe R downstream of detector $DT_2$. In the separation/refinement mode, detector $DT_1$ determines the concentration or purity of the strongly adsorptive constituent in the extract, and detector $DT_2$ determines the concentration or purity of the weakly adsorptive constituent in the raffinate. In the performance evaluation mode, detectors $DT_1$ and $DT_2$ both determine the concentrations of the strongly adsorptive constituent and weakly adsorptive constituent desorbed in the column subjected to the evaluation of performance.

On-off valves VFa to VFd, VDa to VDd, VEa to VEd, VFa to VFd and VRa to VRd are opened or closed by controllers (not shown). Signals from detectors $DT_1$ and $DT_2$ are input into the controllers.

In the simulated moving bed chromatographic separation system as shown in FIG. 1, columns a to d correspond to the packed beds referred to in this invention. Circulating passage FC corresponds to the fluid circulating passage referred to in this invention. Desorbing liquid introducing lines Da to Dd and on-off valves VDa to VDd correspond to the desorbing liquid introducing ports referred to in this invention. Extract draw-out lines Ea to Ed and on-off valves VEa to VEd correspond to the extract draw-out port referred in this invention. Feedstock introducing lines Fa to Fd and on-off valves VFa to Vfd correspond to the feedstock introducing ports referred to in this invention. Raffinate draw-out lines Ra to Rd and on-off valves VRa to VRd correspond to the raffinate draw-out ports referred to in this invention. Desorbing liquid introducing lines Da to Dd, extract draw-out lines Ea to Ed, feedstock introducing lines Fa to Fd and raffinate draw-out lines Ra to Rd correspond to the desorbing liquid introducing pipes, extract draw-out pipes, feedstock introducing pipes and raffinate draw-out pipes, respectively. On-off valves VDa to VDd, VEa to VEd, VFa to VFd and VRa to VRd correspond to the switching means.

In the performance evaluation mode, desorbing liquid introducing lines Da to Dd and on-off valves VDa to Vdd, extract draw-out lines Ea to Ed and on-off valves VEa to VEd, feedstock introducing lines Fa to Fd and on-off valves VFa to VFd, and raffinate draw-out lines Ra to Rd, on-off valves VRa to VRd, and detectors $DT_1$ and $DT_2$ function for evaluating the performance of packed beds of the simulated moving bed chromatographic separation system of this invention. Desorbing liquid introducing lines Da to Dd and on-off valves VDa to VDd serve for the desorbing liquid injecting means. Feedstock introducing lines Fa to Fd and on-off valves VFa to VFd serve for the standard solution injecting means. Extract draw-out lines Ea to Ed, on-off valves VEa to VEd and raffinate draw-out lines Ra to Rd and on-off valves VRa to VRd serve for the liquid discharging pipes. Detectors $DT_1$ and $DT_2$ serve for the detecting means in this invention.

The operation of the simulated moving bed chromatographic separation system of this invention as shown in FIG. 1 will be illustrated below.

In the separation/refinement mode, one of desorbing liquid introducing lines Da to Dd, one of extract draw-out lines Ea to Ed, one of feedstock introducing lines Fa to Fd, and one of raffinate draw-out lines Ra to Rd are connected so as to be arranged in the order of the desorbing liquid line, extract draw-out line, feedstock introducing line and raffinate draw-out line in the direction of the circulating liquid flowing through liquid circulating passage FC, by the on-off control of on-off valves VDa to VDd, VEa to VEd, VFa to VFd and VRa to VRd with the controller. For example, desorbing liquid introducing line Da, extract draw-out line Ea, feedstock introducing line Fc and raffinate draw-out line Rc are connected in circulating passage FC by opening on-off valves VDa, VEa, VFc and VRc and closing all the other on-off valves.

Thus, desorbing zone IV is formed in column a positioned between desorbing liquid introducing line Da and extract draw-out line Ea. Concentrating zone III is formed in column b positioned between extract draw-out line Ea and feedstock introducing line Fc. Refining zone II is formed in column c positioned between feedstock introducing line Fc and raffinate draw-out line Rc. Adsorbing zone I is formed in column d positioned between raffinate draw-out line Rc and desorbing liquid introducing line Da.

Accordingly, in column a containing desorbing zone IV formed therein, the strongly adsorptive constituent adsorbed on the separating fillers packed in column a is desorbed with the desorbing liquid supplied through the feedstock introducing line Fa to circulating passage FC and the circulating liquid circulated through circulating passage FC which is almost free of both the strongly adsorptive and weakly adsorptive constituents. Thus, the desorbed strongly adsorptive constituent transfers into the circulating liquid. Therefore, the concentration of the strongly adsorptive constituent in the circulating liquid is approximately zero (0) at the inlet side of the column a. This concentration increases as the circulating liquid passes through column a. The circulating liquid is discharged from column a when it contains a large amount of the strongly adsorptive constituent. Part of the circulating liquid discharged from column a is drawn out as an extract from extract draw-out line Ea and the other introduced into column b.

In column b containing concentrating zone III formed therein, the strongly adsorptive constituent in the circulating liquid is adsorbed on the separating filler during passing of the circulating liquid through column b. On the other hand, the weakly adsorptive constituent adsorbed on the filler in column b transfers to the circulating liquid. Thus, the concentration of the strongly adsorptive constituent decreases but that of the weakly adsorptive constituent increases while the circulating liquid passes through column b. The circulating liquid discharged from column b is introduced into column c together with the feedstock supplied from feedstock introducing line Fc.

In column c containing refining zone II formed therein, the strongly adsorptive constituent contained in the feedstock and the circulating liquid is adsorbed on the separating filler, and the weakly adsorptive constituent adsorbed on the separating filler transfers to the circulating liquid. Thus, the concentration of the strongly adsorptive constituent in the circulating liquid approaches zero (0) and that of the weakly adsorptive constituent increases while the circulating liquid passes through column c. The circulating liquid containing a larger amount of the weakly adsorptive constituent is discharged at the outlet of column c. Part of the circulating liquid discharged from column c is drawn out as a raffinate from raffinate draw-out line Rc, and the other is introduced into column d.

In column d containing adsorbing zone I formed therein, the high concentration of the weakly adsorptive constituent is adsorbed on the separating filler packed in column d. Thus, a circulating liquid almost free of the strongly and weakly adsorptive constituents is discharged from column d. The circulating liquid discharged from column d is again introduced into column a through pipe $C_2$, pump P and pipe $C_1$.

After a predetermined time elapses, the controller orders on-off valves VDa, VEa, VFc and VRc to close and instead on-off valves Vdd, VEb, VFd and VRd to open, thereby switching desorbing liquid introducing line Da to desorbing liquid introducing line Db, extract draw-out line Ea to extract draw-out line Eb, feedstock introducing line Fc to feedstock introducing line Fd, and raffinate draw-out line Rc to raffinate draw-out line Rd. This switching allows desorbing zone IV to transfer from column a to column b, concentrating zone III to transfer from column b to column c, refining zone II to transfer from column c to column d, and adsorbing zone I to transfer from column d to column a.

Accordingly, in column b, the strongly adsorptive constituent adsorbed on the separating filler is desorbed by the desorbing liquid supplied through the desorbing liquid introducing line Db. Part of the circulating liquid discharged from column b is drawn out through extract draw-out line Eb, and the other is introduced into column c.

In column c, the strongly adsorptive constituent in the circulating liquid is adsorbed on the separating filler, and the weakly adsorptive constituent having been adsorbed on the separating filler transfers to the circulating liquid. Therefore, the concentration of the strongly adsorptive constituent in the circulating liquid decreases, and that of the weakly adsorptive constituent increases while the circulating liquid passes through column c.

The circulating liquid discharged from column c is introduced into column d together with the feedstock supplied from feedstock introducing line Fd. In column d, the strongly adsorptive constituent contained in the feedstock and the circulating liquid is adsorbed on the separating filler, and the weakly adsorptive constituent transfers to the circulating liquid. Part of the circulating liquid discharged from column d is drawn out as a raffinate from raffinate draw-out line Rd, and the other is introduced into column a.

In column a, the strongly and weakly adsorptive constituents contained in the circulating liquid are adsorbed. Thus, the circulating liquid almost free of the strongly and weakly adsorptive constituents is discharged from column a, and then again introduced into column b.

After a predetermined time elapses, the controller orders on-off valves VDb, VEb, VFd and VRd to close and instead on-off valves VDc, VEc, VFa and VRa to open, thereby switching desorbing liquid introducing line Db to desorbing liquid introducing line Dc, extract draw-out line Eb to extract draw-out line Ec, feedstock introducing line Fd to feedstock introducing line Fa, and raffinate draw-out line Rd to raffinate draw-out line Ra. This switching allows desorbing zone IV to transfer from column b to column c, concentrating zone III to transfer from column c to column d, refining zone II to transfer from column d to column a, and adsorbing zone I to transfer from column a to column b.

In the separation/refinement mode, desorbing liquid introducing lines Da to Dd, extract draw-out lines Ea to Ed, feedstock introducing lines Fa to Fd, and raffinate draw-out lines Ra to Rd are in turn switched with on-off valves VFa to VFd, VDa to VDd, VEa to Ved and VRa to VRd in the same manner as mentioned above. This switching allows desorbing zone IV, concentrating zone III, refining zone II and adsorbing zone I to successively shift over columns a to d.

The operation of the simulated moving bed chromatographic separation system in the performance evaluation mode will be illustrated below in an example of evaluating the performance of each of columns a to d.

When the simulated moving bed chromatographic separation system is switched in the performance evaluation mode, pump P firstly stops. Pump P is of a diaphragm type as already mentioned, and hence the stopping of pump P allows the circulating liquid to be prevented with the ball valves from flowing in the direction opposite to the arrow in FIG. 1 through circulating passage FC. The ball valves are provided at the suction and discharge sides of pump P.

Then, on-off valves VDa, and VEa or VRa are opened, and the other on-off valves are closed to discharge the desorbing liquid through desorbing liquid pump $P_D$. The desorbing liquid being introduced from desorbing liquid pump $P_D$ and flowing into desorbing liquid introducing line Da turns to the right as shown in FIG. 1 at the intersection of desorbing liquid introducing line Da and circulating passage FC, and then introduced into column a. The desorbing liquid, after passing through column a, further passes through extract draw-out line Ea, extract draw-out pipe E and detector $DT_1$ and is then removed out, or alternatively, passes through raffinate draw-out line Ra, raffinate draw-out line R and detector $DT_2$ and is then removed out.

The desorbing liquid is supplied by desorbing pump $P_D$ to column a, thus replacing the remaining liquid in column a with the desorbing liquid. After the liquid in column a is replaced with the desorbing liquid, desorbing liquid pump $P_D$ is stopped, and on-off valve VFa is opened. A predetermined amount of the standard solution is injected with feedstock pump $P_F$ on-off valve VFa is closed. Desorbing liquid pump $P_D$ is again started, thus allowing the standard solution to flow into feedstock introducing line Fa.

The standard solution introduced into feedstock introducing line Fa is carried on the flow of the desorbing liquid turning to the right at the intersection of the desorbing liquid introducing line Da and circulating passage FC and enters column a. The strongly adsorptive constituent and the weakly adsorptive constituent in the standard solution are separated from each other in column a. The separated strongly adsorptive constituent and weakly adsorptive constituent are carried on the flow of the desorbing liquid and pass through extract draw-out line Ea, extract draw-out pipe E and back-pressure valve $BV_1$. The concentrations of the strongly adsorptive constituent and weakly adsorptive constituent in the desorbing liquid passing through extract draw-out pipe E are determined with detector $DT_1$. Alternatively, the concentrations of the strongly adsorptive constituent and weakly adsorptive constituent in the desorbing liquid passing through raffinate draw-out line Ra, raffinate draw-out pipe R and back-pressure valve $BV_2$ are determined with detector $DT_2$.

Thus, the chromatogram for column a is obtained.

The separation performance of the column a is evaluated on the basis of the chromatogram.

In the simulated moving bed chromatographic separation system as shown in FIG. 1, the passage is changed by opening on-off valve VDb and on-off valve VEb or VRb and closing the other on-off valves. The desorbing liquid is supplied with desorbing liquid pump $P_D$ to column b, thus purging column b with the desorbing liquid. After the liquid in column b is replaced with the desorbing liquid, desorbing liquid pump $P_D$ is stopped, and on-off valve VFa is opened. A predetermined amount of the standard solution is injected with feedstock pump $P_F$, on-off valve VFb is closed. Desorbing liquid pump $P_D$ is again started, thus allowing the standard solution to flow into feedstock introducing line Fb. Thus, the chromatogram for column b is obtained. The separation performance of the column b is evaluated on the basis of the chromatogram. Similarly, the chromatograms of column c and column d are obtained.

Figure 2:
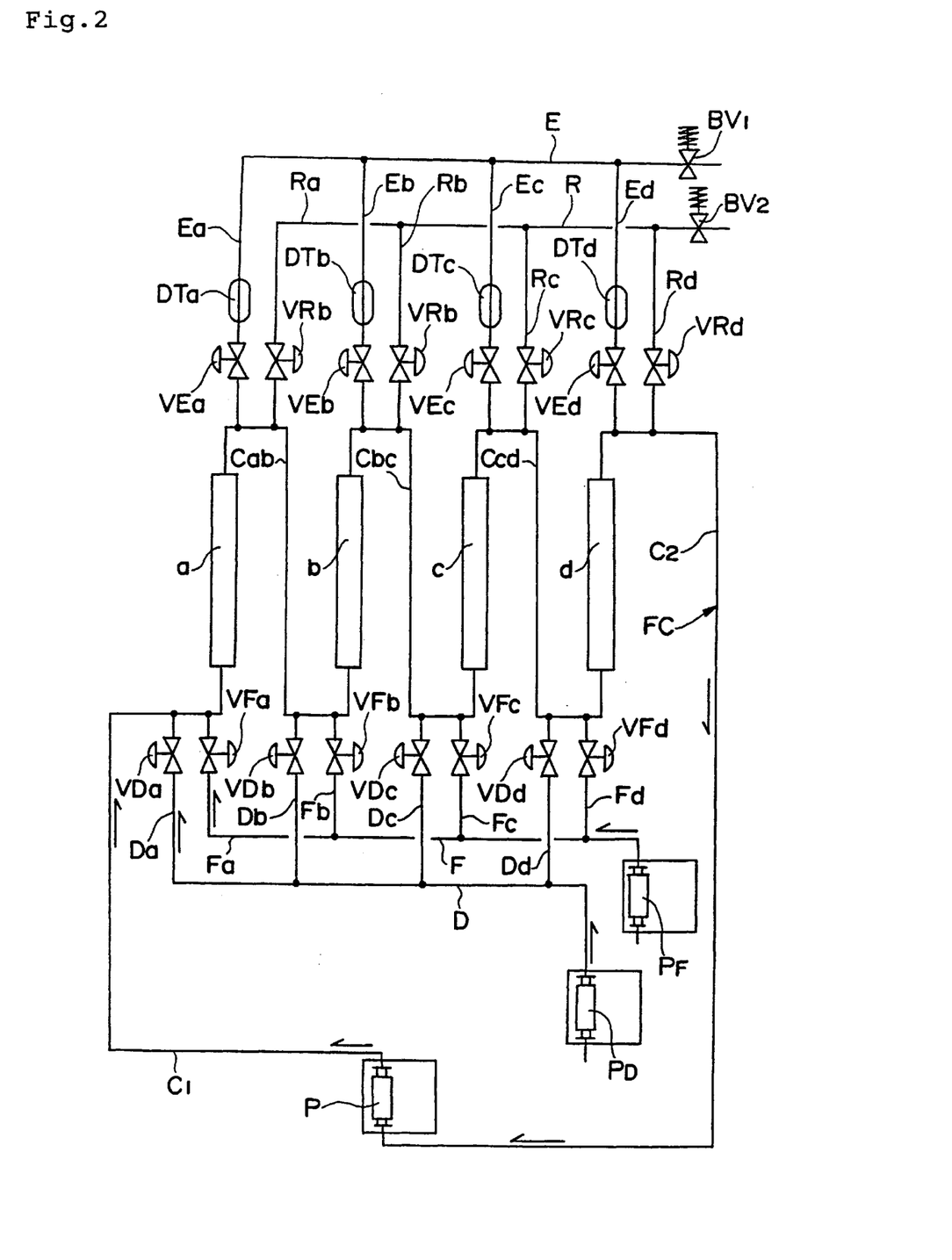
FIG. 2 is a schematic view of the piping of the simulated moving bed chromatographic separation system as shown in FIG. 1, in which detectors are mounted on the respective extract draw-out lines.

FIG. 2 is a schematical view of the piping of the simulated moving bed chromatographic separation system as shown in FIG. 1, in which detectors are mounted on the respective extract draw-out lines.

The simulated moving bed chromatographic separation system as shown in FIG. 1 is different from that as shown in FIG. 2 in that extract draw-out pipe E and raffinate draw-out pipe R are not provided with detector $DT_1$ and detector $DT_2$, but instead extract draw-out lines Ea to Ed are provided with detectors DTa to DTd, respectively. Otherwise, both systems are entirely identical with each other. In the performance evaluation mode, both systems are identical with each other in the respects that the same desorbing liquid as used in the separation/refinement mode is used and the desorbing liquid containing the predetermined concentrations the strongly and weakly adsorptive constituents is used as a standard solution.

Accordingly, in the simulated moving bed chromatographic separation system as shown in FIG. 2, columns a to d correspond to the packed beds referred to in this invention. Circulating passage FC corresponds to the fluid circulating passage referred to in this invention. Column a to column d correspond to the packed beds referred to in this invention. Circulating passage FC corresponds to the fluid circulating passage referred to in this invention. Desorbing liquid introducing lines Da to Dd and on-off valves VDa to VDd correspond to the desorbing liquid introducing ports referred to in this invention. Extract draw-out lines Ea to Ed and on-off valves Ea to Ed and on-off valves VEa to VEd correspond to the extract draw-out port referred in this invention. Feedstock introducing lines Fa to Fd and on-off valves VFa to VFd correspond to the feedstock introducing ports referred to in this invention. Raffinate draw-out lines Ra to Rd and on-off valves VRa to VRd correspond to the raffinate draw-out ports referred to in this invention. Desorbing liquid introducing lines Da to Dd, extract draw-out lines Ea to Ed, feedstock introducing lines Fa to Fd and raffinate draw-out lines Ra to Rd correspond to the desorbing liquid introducing pipes, extract draw-out pies, feedstock introducing pies and raffinate draw-out pipes, respectively. On-off valves VDa to VDd. VEa to VEd, VFa to VFd and VRa to VRd correspond to the switching means.

When the simulated moving bed chromatographic separation system as shown in FIG. 2 is operated in the performance evaluation mode, on-off valves VDa to VDd, VEa to VEd and VFa to VFd, and detectors DTa to DTd serve for the means for evaluating the performance of the packed beds in the simulated moving bed chromatographic separation system of this invention. On-off valves VDa to VDd serve for the desorbing liquid injecting means in the means for evaluating the performance of the packed beds. On-off valves VEa to VEd serve for the standard solution injecting means in the means for evaluating the performance of the packed beds. Detector DTa to detector DTd serve for the detectors in the means for evaluating the performance of the packed beds.

The operation of the simulated moving bed chromatographic separation system as shown in FIG. 2 will be illustrated below.

In the separation/refinement mode, as in the simulated moving bed chromatographic separation system as shown in FIG. 1, desorbing liquid introducing lines Da to Dd, extract draw-out lines Ea to Ed, feedstock introducing lines Fa to Fd, and raffinate draw-out lines Ra to Rd are in turn switched with on-off valves VFa to VFd, VDa to VDd, VEa to VEd and VRa to VRd. This switching allows desorbing zone IV, concentrating zone III, refining zone II and adsorbing zone I to shift over columns a to d.

The operation of the simulated moving bed chromatographic separation system in the performance evaluation mode will be illustrated below.

In the performance evaluation mode, pump P is stopped. Pump P is of a diaphragm type as already mentioned, and hence the stopping of pump P allows the circulating liquid to be prevented with the ball valves from flowing in the direction opposite to the arrow in FIG. 2 through circulating passage FC. The ball valves are provided at the suction and discharge sides of pump P.

Then, on-off valves VDa, and VEa or VRa are opened to discharge the desorbing liquid through desorbing liquid pump $P_D$. The desorbing liquid from desorbing liquid pump $P_D$ passes through desorbing liquid introducing lines Fa to Fd and enters columns a to d, and is removed out through extract draw-out lines Ea to Ed.

Figure 3:
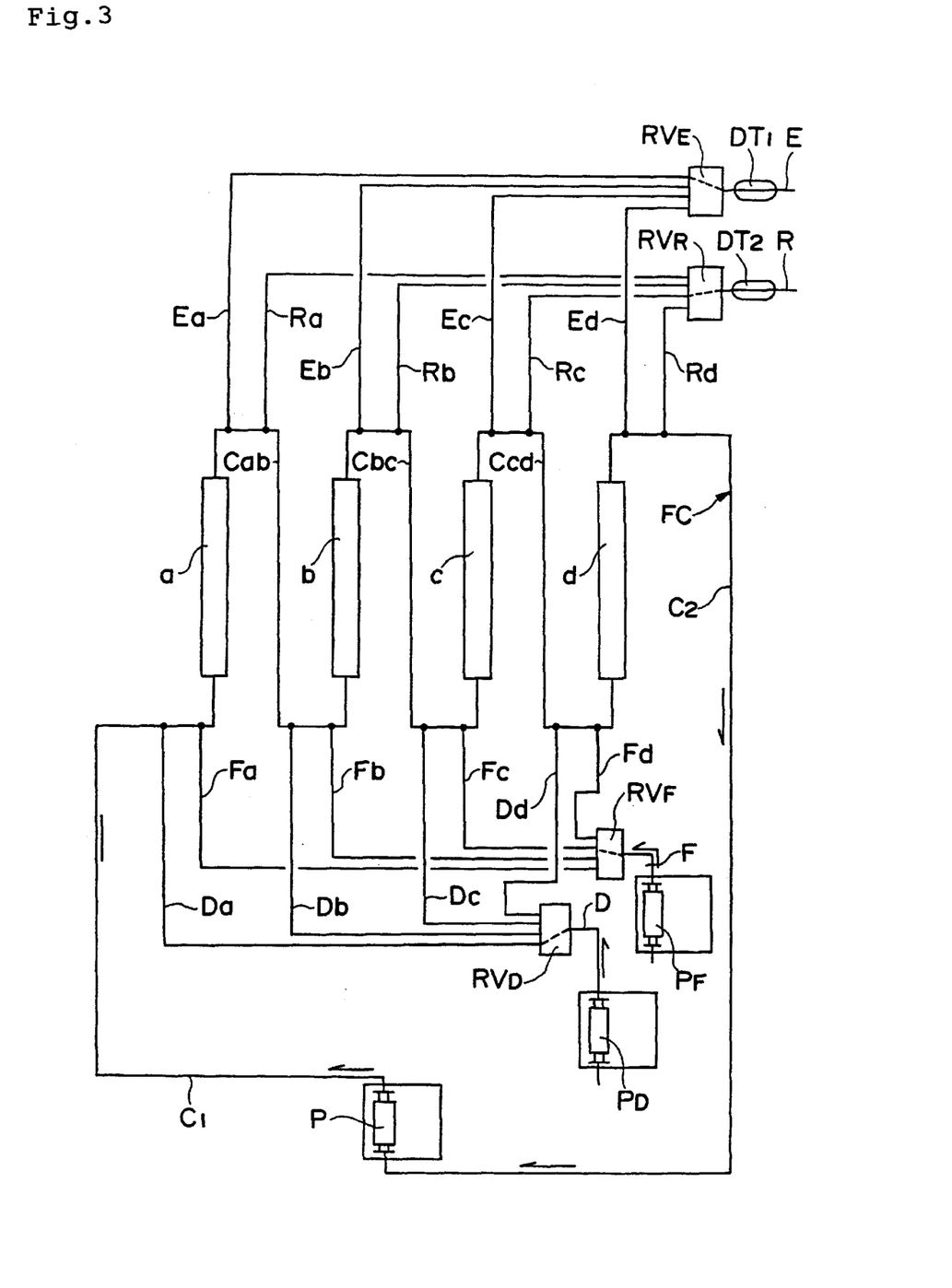
FIG. 3 is a schematic view of the piping of the simulated moving bed chromatographic separation system as shown in FIG. 1, in which the desorbing liquid introducing line, extract draw-out line, feedstock introducing line and raffinate draw-out line can be switched by respective rotary valves.

Injecting a predetermined amount of the standard solution with feedstock pump $P_F$ allows the standard solution to pass through feedstock introducing lines Fa to Fd into columns a to d, in which the strongly adsorptive constituent and weakly adsorptive constituent in the standard solution are separated. The strongly adsorptive constituent and weakly adsorptive constituent separated in columns a to d are carried on the flow of the desorbing liquid and passes through extract draw-out lines Ea to Ed, while they are detected by detectors DTa to DTd. Thus, the chromatograms of columns a to d are obtained, so that the performances of columns a to d can be evaluated simultaneously. FIG. 3 is a schematic view of the piping of the simulated moving bed chromatographic separation system as shown in FIG. 1, in which the desorbing liquid introducing line, extract draw-out line, feedstock introducing line and raffinate draw-out line can be switched by the respective rotary valves.

The simulated moving bed chromatographic separation system as shown in FIG. 3 is identical with that in FIG. 1, except that rotary valves $RV_D$, $RV_E$, $RV_F$ and $RV_R$, are employed for switching desorbing liquid introducing lines Da to Dd, extract draw-out lines Ea to Ed, feedstock introducing lines Fa to Fd and raffinate draw-out lines Ra to Rd. Furthermore, in the performance evaluation mode, the same desorbing liquid as used in the separation/refinement mode is used for the desorbing liquid, whereas a solution containing the predetermined concentrations of the strongly and weakly adsorptive constituents is used for the standard solution. In this respect, the simulated moving bed chromatographic separation system as shown in FIG. 3 is identical with that as shown in FIG. 1.

Accordingly, in the simulated moving bed chromatographic separation system as shown in FIG. 3, columns a to d correspond to the packed beds referred to in this invention. Circulating passage FC corresponds to the fluid circulating passage referred to in this invention. Desorbing liquid introducing lines Da to Dd and rotary valve $RV_D$ correspond to the desorbing liquid introducing ports referred to in this invention. Extract draw-out lines Ea to Ed, on-off valves Ea to Ed and rotary valve $RV_E$ correspond to the extract draw-out ports referred in this invention. Feedstock introducing lines Fa to Fd and rotary valve $RV_E$ correspond to the feedstock introducing ports referred to in this invention. Raffinate draw-out lines Ra to Rd and rotary valve $RV_R$ correspond to the raffinate draw-out ports referred to in this invention. Desorbing liquid introducing lines Da to Dd, extract draw-out lines Ea to Ed, feedstock introducing lines Fa to Ed and raffinate-discharging lines Ra to Rd correspond to the desorbing liquid introducing pipes, extract draw-out pies, feedstock introducing pies and raffinate draw-out pipes, respectively. Rotary valves $RV_D$, $RV_E$, $RV_F$, and $RV_R$, correspond to the switching means.

When the simulated moving bed chromatographic separation system as shown in FIG. 3 is operated in the performance evaluation mode, rotary valves $RV_D$, $RV_E$, $RV_F$, and $RV_R$, and detectors $DT_1$ and $DT_2$ serve as means for evaluating the performance of the packed beds of the system. Rotary valve $RV_D$ serves as means for injecting the desorbing liquid into the means for evaluating the performance of the packed beds. Rotary valve $RV_E$ serves as means for injecting the standard in the means for evaluating the performance of the packed beds. Detectors $DT_1$ and $DT_2$ serve as a detector in the means for evaluating the performance of the packed beds.

The operation of the simulated moving bed chromatographic separation system as shown in FIG. 3 will be illustrated below.

In the separation/refinement mode, desorbing liquid introducing lines Da to Dd and extract draw-out lines Ea to Ed are in turn switched with rotary valves $DV_D$ and $RV_E$, respectively. Feedstock introducing lines Fa to Fd and raffinate draw-out lines Ra to Rd are in turn switched with rotary valves $RV_F$ and $RV_R$, respectively. Thus, desorbing zone IV, concentrating zone III, refining zone II and adsorbing zone I are shifted over columns a to d. FIG. 3 shows one condition under which desorbing liquid introducing line Da is connected to desorbing liquid pump $P_D$, feedstock introducing line Fc to feedstock pump $P_F$, extract draw-out line Ea to extract draw-out pipe E, and raffinate draw-out line Rc to raffinate draw-out pipe R.

Figure 4:
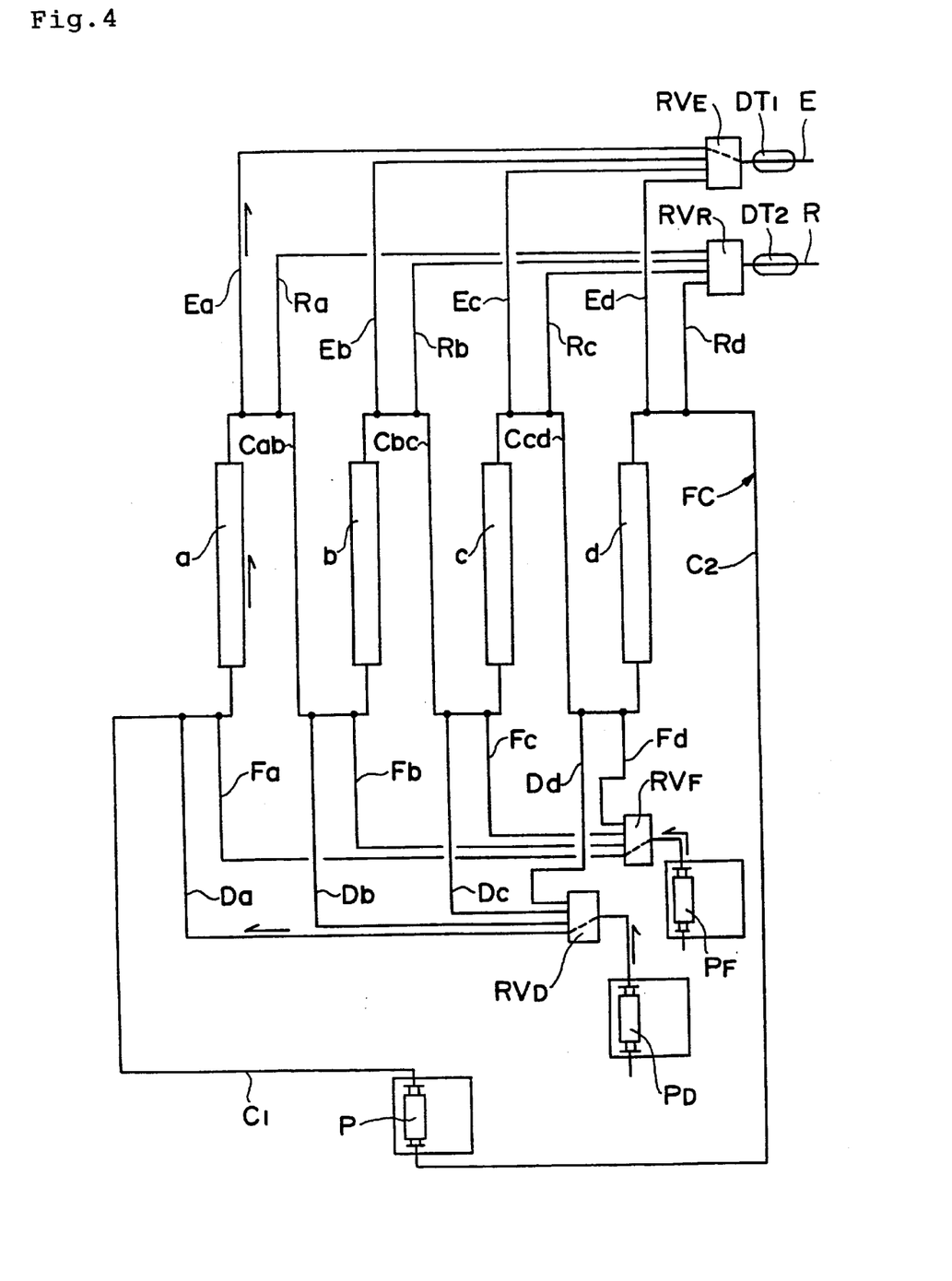
FIG. 4 is a schematic view of the piping of the simulated moving bed chromatographic separation system as shown in FIG. 3 in a performance evaluation mode.

The operation of the simulated moving bed separation system in the performance evaluation mode will be illustrated below.

FIG. 4 is a schematic view of the piping of the simulated moving bed chromatographic separation system as shown in FIG. 3 in a performance evaluation mode.

Pump P is firstly stopped when the separation performance is to be evaluated. Pump P is of a diaphragm type as already mentioned, and hence stopping pump P prevents the circulating liquid from flowing in the direction opposite to the arrow in FIG. 3 through circulating passage FC with the ball valves provided at the suction side and discharge side of pump P.

Then, rotary valves $RV_D$, $RV_E$ and $RV_F$ are switched, so that desorbing liquid introducing line Da is connected to desorbing liquid pump $P_D$, feedstock introducing line Fa to feedstock pump $P_F$, and extract draw-out line Ea to extract draw-out pipe E. Rotary valve $RV_R$ is switched so that raffinate draw-out line Ra is not connected to raffinate draw-out pipe R, in other words, any one of the raffinate draw-out lines Rb to Rd is connected to raffinate draw-out pipe R, or that none of the raffinate draw-out lines Ra to Rd is connected to raffinate draw-out pipe R and they are closed.

In this situation, supplying the desorbing liquid from desorbing liquid pump $P_D$ allows the desorbing liquid to pass through desorbing liquid introducing line Da, column a and extract draw-out line Ea, and then is removed out from extract draw-out pipe E.

Once the liquid in column a is replaced with the desorbing liquid, desorbing liquid pump $P_D$ is stopped. In such condition, a predetermined amount of the standard solution is supplied, and pump $P_D$ is again started. Thus, the standard solution passes through feedstock introducing line Fa into column a.

In column a, the strongly adsorptive constituent and weakly adsorptive constituent are separated. The strongly and weakly adsorptive constituents separated in column a are carried on the flow of the desorbing liquid, and is discharged through extract draw-out line Ea, and detected with detector $DT_1$. Thus, a chromatogram is obtained for column a, so that the separation performance of column a can be evaluated.

In order to evaluate the separation performance of column b, rotary valves $RV_D$, $RV_E$ and $RV_F$ are switched, so that desorbing liquid introducing line Db is connected to desorbing liquid pump $P_D$, feedstock introducing line Fb to feedstock pump $P_F$, and extract draw-out line Eb to extract draw-out line E.

In order to evaluate the separation performance of column b, rotary valves $RV_D$, $RV_E$ and $RV_F$ are switched, so that desorbing liquid introducing line Dd is connected to desorbing liquid pump $P_D$. feedstock introducing line Fc to feedstock pump $P_F$, and extract draw-out line Ed to extract draw-out line E.

In order to evaluate the separation performance of column d, rotary valves $RV_D$, $RV_E$ and $RV_F$ are switched, so that desorbing liquid introducing line Dd is connected to desorbing liquid pump $P_D$, feedstock introducing line Fd to feedstock pump $P_F$, and extract draw-out line Ed to extract draw-out line E.

Effects of the Invention

According to this invention, the simulated moving bed chromatographic separation system is provided, in which the performance of the system can be examined on which has the cause of the system's deterioration, the packed beds or the others. If the deterioration is due to the packed beds, the examination on which bed is deteriorated can be carried out without removing the packed beds from the system.

One embodiment of the simulated moving bed chromatographic separation system, which is provided at the inlet side end of each of packed beds with a desorbing liquid introducing pipe equipped with an on-off valve, is characterized in that the separation performance of the packed beds included in the system can be examined simultaneously.

What is claimed is:

1. A simulated moving bed chromatographic separation system for separating from a feedstock the constituents thereof, which comprises a fluid circulating passage having the fluid forcibly circulated therethrough and having at least four packed beds filled with separating fillers and connected in series and endlessly to each other; a desorbing liquid introducing port for introducing the desorbing liquid into the fluid circulating passage; an extract draw-out port for drawing out the extract containing a larger amount of a constituent strongly adsorbed on said fillers, of constituents contained in the feedstock, from said fluid circulating passage; a feedstock introducing port for introducing the feedstock into said fluid circulating passage; and a raffinate draw-out port for drawing out the raffinate containing a larger amount of a constituent weakly adsorbed on the fillers, of said constituents, wherein said desorbing liquid introducing port, extract draw-out port, feedstock introducing port and raffinate draw-out port are arranged in this order in the direction of fluid flow on said fluid circulating passage, and designed so that the positions of these ports are successively but intermittently shifted along said fluid circulating passage without changing said order, said system also comprising packed bed performance evaluating means for examining the condition of each of said constituents separated in each of said packed beds, by injecting a standard solution known for the kinds of constituents contained and their concentrations and said desorbing liquid into each of said packed beds.

2. A simulated moving bed chromatographic separation system according to claim 1, which is provided with desorbing liquid injecting means for injecting the desorbing liquid at the inlet side end of said packed beds, standard solution injecting means for injecting the standard solution at the inlet side end of said packed beds, and detector means at the outlet side end of said packed beds for detecting the constituents desorbed by said packed beds.

3. A simulated moving bed chromatographic separation system comprising a packed bed assembly consisting of a plurality of unit packed beds each containing a filler packed therein, bed performance evaluation means for evaluating the separating performance of each packed bed, and said unit packed beds being connected in series to each other and having introducing and discharging ends thereof connected to each other endlessly via a fluid passage to circulate fluid unidirectionally;

wherein a port for introducing a desorbing liquid, a port for drawing out a solution containing an extract, a port for introducing a feedstock fluid and a port for drawing out a solution containing a raffinate are provided for each of said unit packed beds in the system and arranged in this order along the direction of fluid flow; said desorbing liquid introducing port, extract draw-out port, feedstock introducing port and raffinate draw-out port are designed so that their positions are successively but intermittently shifted in the direction of fluid flow;

wherein said bed performance evaluation means comprises a desorbing liquid injecting means for injecting a desorbing liquid into said introducing end of each of said unit packed beds, standard solution injecting means for injecting a standard solution into said introducing end of each of said unit packed beds, and detecting means for detecting components having been separated by each of said unit packed beds.

4. A simulated moving bed chromatographic separation system according to claim 3, wherein said standard solution injecting means comprises plural standard solution injecting pipes, each of which is attached to said introducing end of each of said unit packed beds, and standard solution feeding means for feeding said standard solution to each of said standard solution injecting pipes.

5. A simulated moving bed chromatographic separation system according to claim 4, further comprising a rotary valve having an inlet and plural outlets, said inlet being connected to said standard solution feeding means and each of said outlets being connected to each of said standard solution injecting pipes, thereby selecting one of said standard solution injecting pipes by change-over of said rotary valve.

6. A simulated moving bed chromatographic separation system according to claim 4, wherein said standard solution feeding means comprises a pump selected from the group consisting of a plunger pump and a diaphragm pump.

7. A simulated moving bed chromatographic separation system according to claim 4, further comprising a first rotary valve, a second rotary valve, a third rotary valve and a fourth rotary valve, said first rotary valve having a first inlet and a plurality of outlets, with each of said outlets being connected to a separate unit packed bed, whereby said first rotary valve is coupled to each of said unit packed beds, said first rotary valve being designed to supply said feedstock fluid to any selected one of the unit packed beds in said packed bed assembly;

said second rotary valve having a first outlet and a plurality of inlets, with each of said inlets being connected to a separate unit packed bed, whereby said second rotary valve is coupled to each of said unit packed beds, said second rotary valve being designed to draw out said solution containing a raffinate from the unit packed bed positioned downstream of the unit packed bed to which said feedstock has been supplied;

said third rotary valve having a second inlet and a plurality of outlets, with each of said outlets being connected to a separate unit packed bed, whereby said third rotary valve is coupled to each of said unit packed beds, said third rotary valve being designed to supply said desorbing liquid to the unit packed bed positioned downstream of the unit packed bed from which said solution containing a raffinate has been drawn out;

said fourth rotary valve having a second outlet and a plurality of inlets, with each of said inlets being connected to a separate unit packed bed, whereby said fourth rotary valve is coupled to each of said unit packed beds, said fourth rotary valve being designed to select a unit packed bed to which said desorbing liquid has been supplied and to draw out said solution containing an extract from said selected unit packed bed;

wherein said first inlet serves for said desorbing liquid introducing port, said first outlet for said raffinate draw-out port, said second inlet for said feedstock introducing port and said second outlet for said extract draw-out port, and said first inlet, said first outlet, said second inlet and said second outlet are successively but intermittently shifted without changing this order by the change-over operations of said first to fourth rotary valves.

8. A simulated moving bed chromatographic separation system according to claim 7, further comprising a rotary valve having an inlet and a plurality of outlets, said inlet being connected to said standard solution feeding means and each of said outlets being connected to each said standard solution injecting pipe, thereby selecting one of said standard solution injecting pipes by change-over of said rotary valve.

9. A simulated moving bed chromatographic separation system according to claim 7, wherein said detecting means comprises first detector means for detecting the concentration of an extract and second detector means for detecting the concentration of a raffinate, said first detector means is placed in said fluid passage just after said fourth rotary valve in the direction of fluid flow, and said second detector means is placed in said fluid passage just after said second rotary valve in the direction of fluid flow.

10. A simulated moving bed chromatographic separation system according to claim 3, wherein said desorbing liquid is introduced into said unit packed beds via said desorbing liquid introducing port, and said standard solution is introduced into said unit packed beds via said feedstock introducing port.

11. A simulated moving bed chromatographic separation system according to claim 3, wherein said feedstock introducing port comprises a first valve, said raffinate draw-out port comprises a second valve, said desorbing liquid introducing port comprises a third valve, and said extract draw-out port comprises a fourth valve.

12. A simulated moving bed chromatographic separation system according to claim 11, wherein said first, second, third and fourth valves are on-off valves.

13. A simulated moving bed chromatographic separation system according to claim 3, further comprising a first rotary valve, a second rotary valve, a third rotary valve and a fourth rotary valve, said first rotary valve having a first inlet and a plurality of outlets, with each of said outlets being connected to a separate unit packed bed, whereby said first rotary valve is coupled to each of said unit packed beds, said first rotary valve being designed to supply said feedstock fluid to any selected one of the unit packed beds in said packed bed assembly;

said second rotary valve having a first outlet and a plurality of inlets, with each of said inlets being connected to a separate unit packed bed, whereby said second rotary valve is coupled to each of said unit packed beds, said second rotary valve being designed to draw out said solution containing a raffinate from the unit packed bed positioned downstream of the unit packed bed to which said feedstock fluid has been supplied;

said third rotary valve having a second inlet and a plurality of outlets, with each of said outlets being connected to a separate unit packed bed, whereby said third rotary valve is coupled to each of said unit packed beds, said third rotary valve being designed to supply said desorbing liquid to the unit packed bed positioned downstream of the unit packed bed from which said solution containing a raffinate has been drawn out;

said fourth rotary valve having a second outlet and a plurality of inlets, with each of said inlets being connected to a separate unit packed bed, whereby said fourth rotary valve is coupled to each of said unit packed beds, said fourth rotary valve being designed to select a unit packed bed to which said desorbing liquid has been supplied and to draw out said solution containing an extract from said selected unit packed bed;

wherein said first inlet serves for said desorbing liquid introducing port, said first outlet for said raffinate draw-out port, said second inlet for said feedstock introducing port and said second outlet for said extract draw-out port, and said first inlet, said first outlet, said second inlet and said second outlet are successively but intermittently shifted without changing this order by the change-over operations of said first to fourth rotary valves.

14. A simulated moving bed chromatographic separation system according to claim 13, wherein said detecting means comprises first detector means for detecting the concentration of an extract and second detector means for detecting the concentration of a raffinate, said first detector means is placed in said fluid passage just after said fourth rotary valve in the direction of fluid flow, and said second detector means is placed in said fluid passage just after said second rotary valve in the direction of fluid flow.

\* \* \* \* \*